Aug. 14, 1951 R. F. SALTON 2,563,874
MOBILE HEATED TRAY
Filed Sept. 29, 1948 2 Sheets-Sheet 1

INVENTOR.
RUTH F. SALTON
BY John P. Chandler
her ATTORNEY

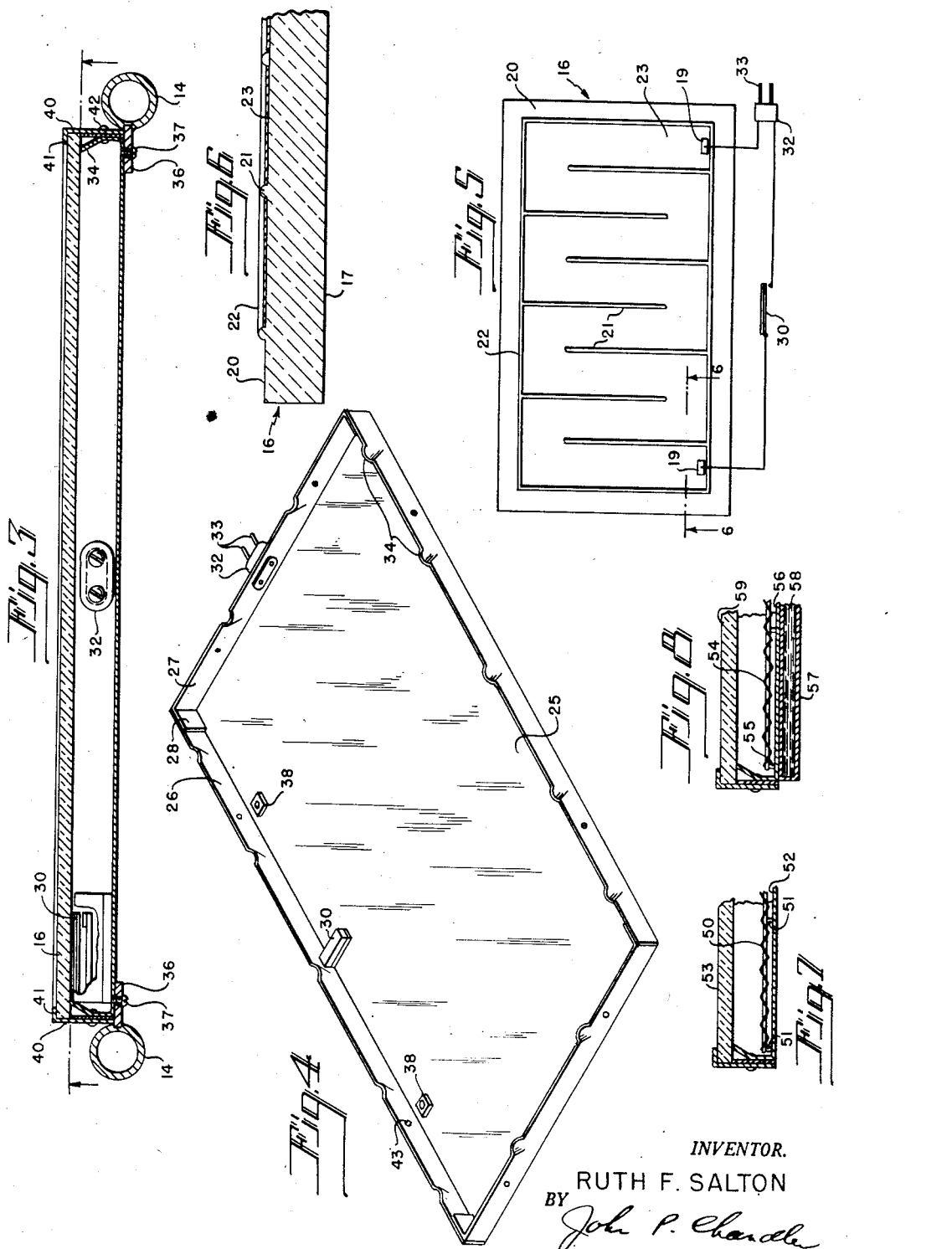

Patented Aug. 14, 1951

2,563,874

UNITED STATES PATENT OFFICE 2,563,874

MOBILE HEATED TRAY

Ruth F. Salton, New York, N. Y.

Application September 29, 1948, Serial No. 51,740

2 Claims. (Cl. 219—19)

This invention relates to portable serving tables provided with plural shelves or trays and having heating means associated with one or more of such trays to enable hot food which is prepared in the kitchen to be conveniently transported to the dining room or porch and to remain hot until it is desired to serve the food.

The mobile heated tray of the present invention is particularly useful in a home wherein there is no domestic help since it enables one to place the entire meal upon the heated tray and renders trips to the kitchen during the course of the meal entirely unnecessary.

An important object of the present invention is to provide a novel portable table having the general appearance of a conventional tea cart and wherein heating means are associated with the table top, such means, however, being invisible so that if a cold meal is being served, the table may be used as a conventional tea cart.

Another object of the invention is to provide a novel mobile serving table having heating means associated with the table top which is preferably formed of heat resistant glass and which is provided adjacently its lower surface with heat reflecting means.

A temperature of about 215° Fahrenheit is most suitable for food warming purposes and means are provided to heat the table top to such temperature in the shortest possible time and then retain this temperature without further increase.

Another object of the invention is to provide a novel heated tray of the character described and having means for retaining the heat after the power has been disconnected.

In the drawing:

Fig. 3 is a transverse section of the upper portion of the device the section being taken on line 3—3 of Fig. 2.

Fig. 4 is a perspective view of the combined heating element support and heat reflector.

Fig. 5 is a bottom plan view of the heating element.

Fig. 6 is a broken section taken on line 6—6 of Fig. 5.

Fig. 7 is a broken vertical section showing a modified form of heating arrangement.

Fig. 8 shows another modification.

Figure 1:
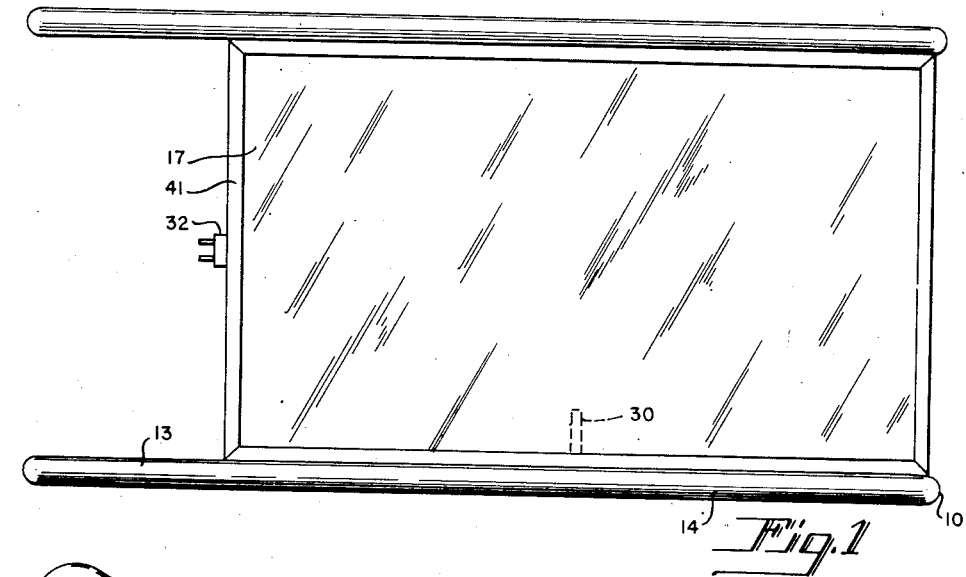
Fig. 1 is a top plan view of a preferred embodiment of the present invention.
Figure 2:
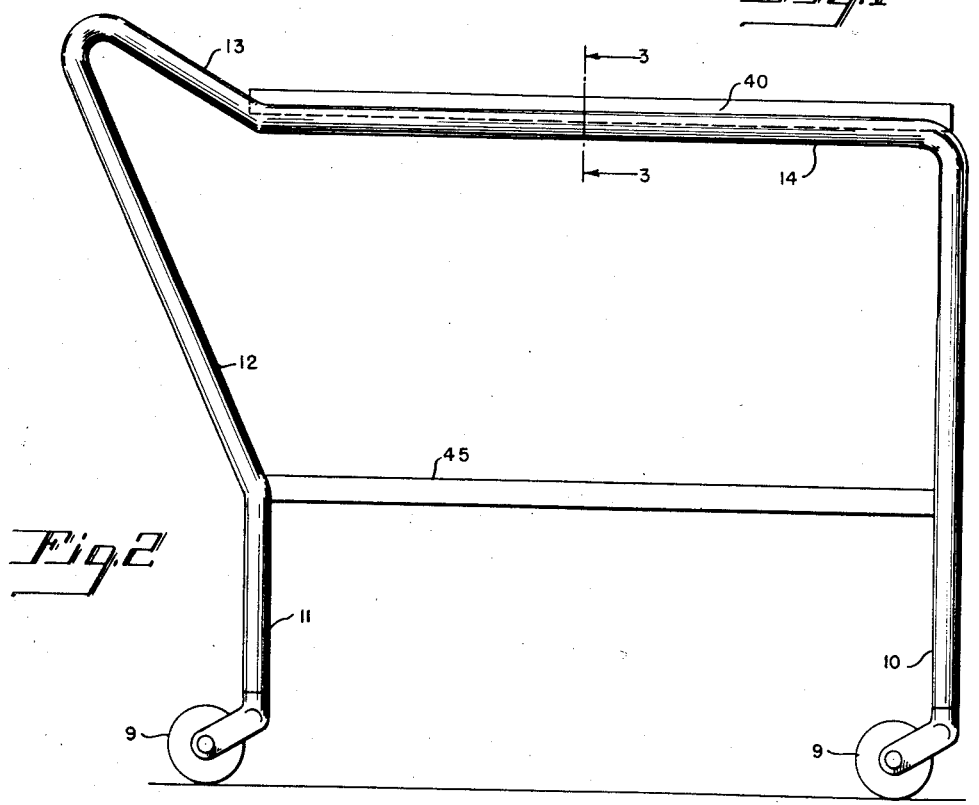
Fig. 2 is a side elevation thereof.

The mobile tray of the present invention is provided with a frame which may be of tubular construction. In Figs. 1 and 2 this frame is shown as comprising a similarly formed member on each side of the structure, the member including a front leg 10, a rear leg 11 having a rearwardly inclined section 12, a downwardly inclined section 13 and a horizontal, interconnecting section 14 and wheels 9.

The heating unit may comprise a sheet 16 of heat resistant glass or other similar material whose upper surface 17 may be substantially smooth or it may have an all-over non-smooth contour which is formed during manufacture, the non-smooth surface acting to prevent dishes from moving on the surface during transport.

On its lower surface 20 it is formed with a plurality of transversely disposed, alternately arranged ridges 21 extending inwardly from one edge thereof, each such ridge, stopping short of the opposite edge. Such edges also continue around the margin of the sheet, in spaced relation thereto, as shown at 22. An all-over metal coating 23 is first applied within the confines of border ridges 22 by any known means and the metal then removed from the transverse ridges 21.

Electrodes 19 may then be suitably secured adjacent the opposed ends of the plate and when current is applied to such electrodes, the metal coating acts as a heating element.

Plate 16 is supported on a tray-like member formed preferably of sheet metal and comprising a base wall 25 and relatively shallow side walls 26 and end walls 27. Folded tabs 28 integrally formed at opposite ends of the end walls may be secured as by means of welding to the opposed terminals of side walls 26. A bi-metallic thermostatic element 30 is associated with one side wall of the member. A terminal 32 having plugs 33 is affixed to one of the end walls 27.

At spaced intervals around the side and end walls, there are formed inwardly facing ears 34 which form yieldable seats upon which the plate 16 rests. A plurality of flat supports 36 are secured at spaced points along horizontal sections 14 of the side frames and screws 37 pass through openings in such supports and are received in nuts 38 secured as by welding at spaced intervals on the lower wall 25 of the tray-like member. The sheet 16 is mounted and is secured on the upper surface of the side and end walls of the tray-like member by means of angular frame members 40 having an upper flange 41 which engages the upper surface of the glass. Member 40 is secured by means of bolts or rivets 42 which pass through openings 43 in the side walls of the tray-like member which, as aforesaid, is secured on supports 36.

A lower shelf or tray 45 is secured to legs 10 substantially midway between the upper tray and the floor. If desired, this lower tray may also have the same construction with a heating element on the upper tray.

The circuit arrangement is shown in Fig. 5 and includes the electrodes 19 affixed to the metal coating 23, the heat responsive switch 30 and the lines leading to plug 32 which is connected with the power lines (not shown).

To use the apparatus the power may be connected with the heating element a sufficient time before the meal is to be served to obtain the desired heat and the individual dishes then placed upon the upper tray and the unit wheeled to the dining room. The power may again be re-established and the heated tray remains hot during the entire meal. The supporting frame has been purposely constructed of metallic or scorch-proof material, preferably tubular steel, to dissipate any heat which may be conducted thereto by the tray. In addition the wheels 9 accomplish a secondary purpose of further insulating the heated tray from the floor.

In the modified arrangement of Fig. 7, the heating element 50 is a conventional coil mounted between posts 51 carried on the lower wall 52 of the tray-like member and is thus not physically associated with the glass top 53. Whereas the lower wall of the tray-like member may be constructed of sheet metal, it may also be made from plastic or other sheet materials, either with or without a metallic coating for heat reflecting purposes.

In Fig. 8 a similar heating arrangement including element 54 and posts 55 is shown. In this instance, the support is a closed hollow chamber comprising an upper wall 56 and a lower wall 57 which may contain oil or other fluid 58 for retaining the heat for a longer period than would be the case with the arrangement of Fig. 1. The glass top 59 is again mounted in spaced relation to the lower support.

While three forms or embodiments of the invention have been shown and described herein for illustrative purposes, and the construction and arrangement incidental to specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A mobile food heating device of the class described including a tubular frame, plural legs dependent therefrom and plural wheels journalled thereon, a tray comprising a substantially rectangular sheet metal member having upwardly extending shallow side walls, plural inwardly facing ears carried by said side walls and extending upwardly, the upper ends thereof terminating on substantially the same plane as that occupied by the upper edge of said side walls, a glass member adapted to be supported on said ears with the side edges thereof being substantially parallel to the outer surfaces of said side walls, angular side members secured to said side walls having inwardly extending flanges thereon, said flanges arranged to engage the upper surface of said glass member, a plurality of tray supporting members secured to the lower surface of said sheet metal member and extending outwardly therefrom, lateral slots in the periphery of said tubular frame and said tray supporting members arranged to be slidably positioned in said lateral slots.

2. A mobile food heating device of the class described including a tubular frame, plural legs dependent therefrom and plural wheels journalled thereon, a tray comprising a substantially rectangular sheet metal member having upwardly extending shallow side walls, plural inwardly facing ears carried by said side walls and extending upwardly, the upper ends thereof terminating on substantially the same plane as that occupied by the upper edge of said side walls, a glass member adapted to be supported on said ears with the side edges thereof being substantially parallel to the outer surfaces of said side walls, angular side members secured to said side walls having inwardly extending flanges thereon, said flanges arranged to engage the upper surface of said glass member, a plurality of tray supporting members secured to the lower surface of said sheet metal member and extending outwardly therefrom, lateral slots in the periphery of said tubular frame and said tray supporting members arranged to be slidably positioned in said lateral slots, and electrical heating means disposed intermediate said sheet metal member and said glass member.

RUTH F. SALTON.

REFERENCES CITED

The following references are of record in the file of this patent:

UNITED STATES PATENTS

| Number | Name | Date |
| --- | --- | --- |
| 886,537 | McNiven | May 5, 1908 |
| 912,035 | Schaefle | Feb. 9, 1909 |
| 1,505,299 | Stirn | Aug. 19, 1924 |
| 1,850,193 | Zahner | Mar. 22, 1932 |
| 1,871,705 | Keul | Aug. 16, 1932 |
| 2,119,680 | Long | June 7, 1938 |
| 2,251,582 | White | Aug. 5, 1941 |
| 2,466,085 | Dourelie | Apr. 5, 1949 |